US012724473B2

(12) United States Patent
Manne et al.

(10) Patent No.: US 12,724,473 B2
(45) Date of Patent: Sep. 1, 2026

(54) DIE POWER MANAGEMENT

(71) Applicant: ADVANCED MICRO DEVICES, INC., Santa Clara, CA (US)

(72) Inventors: Srilatha Manne, Seattle, WA (US); Rajagopalan Desikan, Austin, TX (US)

(73) Assignee: ADVANCED MICRO DEVICES, INC., Santa Clara, CA (US)

( * ) Notice: Subject to any disclaimer, the term of this patent is extended or adjusted under 35 U.S.C. 154(b) by 222 days.

(21) Appl. No.: 18/619,775

(22) Filed: Mar. 28, 2024

(65) Prior Publication Data

US 2025/0306668 A1 Oct. 2, 2025

(51) Int. Cl.

| | |
|---|---|
| ***G06F 1/32*** | (2019.01) |
| ***G06F 1/3228*** | (2019.01) |
| ***G06F 1/3287*** | (2019.01) |

(52) U.S. Cl.
CPC .......... *G06F 1/3287* (2013.01); *G06F 1/3228* (2013.01)

(58) Field of Classification Search
CPC ............................ G06F 1/3287; G06F 1/3228
See application file for complete search history.

(56) References Cited

U.S. PATENT DOCUMENTS

| | | | | |
|---|---|---|---|---|
| 9,696,790 B2 | | 7/2017 | Beck et al. | |
| 2009/0199020 A1* | | 8/2009 | Bose | G06F 1/3287 713/300 |
| 2009/0204835 A1* | | 8/2009 | Smith | G06F 1/3287 713/323 |
| 2014/0059548 A1* | | 2/2014 | Ahmad | G06F 9/5088 718/100 |

OTHER PUBLICATIONS

Cortez et al. "Resource Central: Understanding and Predicting Workloads for Improved Resource Management in Large Cloud Platforms," SOSP'17, Oct. 28, 2017, Shanghai, China, Association for Computing Machinery, https://doi.org/10.1145/3132747.3132772, 15 pages.

* cited by examiner

*Primary Examiner* — Stefan Stoynov

(57) ABSTRACT

A processor includes two or more core dies each including one or more processor cores and/or associated with one or more input/output dies. A hypervisor, firmware in a central processing unit (CPU), or software or firmware located outside of the CPU assigns virtual machines or threads to a first core die and disconnects power from a second core die with no active threads or cores, e.g., by adjusting one or more voltage regulators associated with the second core die, while still providing power to the first core die. In some implementations, active threads or processing cores are migrated from sparsely allocated processing cores or core dies into a reduced number of core dies. Power usage is minimized by disconnecting one or more inactive core dies from power while performance is maximized by increasing the clock frequency of remaining active core dies or remaining active processing cores located therein.

17 Claims, 4 Drawing Sheets

DIE POWER MANAGEMENT

BACKGROUND

Modern computing often utilizes a central processing unit (CPU) that includes one or more core dies (e.g., core chiplet dies and input/output (IO) dies, among others). Each core die typically includes one or more processor cores each configured to execute instructions, workloads, operations, or any combination thereof for an application executed by a processing system. Each IO die typically includes logic to transport data across the core dies and to parts of the IO sub-system. The processing system typically allocates a core die or one or more processor cores of the CPU to one or more virtual machines (VM) or threads executed by the processing system and each core is typically connected to a single primary IO die. However, allocating VMs or threads to different core dies or processing cores in different core dies often results in sparse utilization of the processor cores and therefore an inefficient use of resources.

BRIEF DESCRIPTION OF THE DRAWINGS

The present disclosure may be better understood, and its numerous features and advantages made apparent to those skilled in the art by referencing the accompanying drawings. The use of the same reference symbols in different drawings indicates similar or identical items.

DETAILED DESCRIPTION

Figure 1:
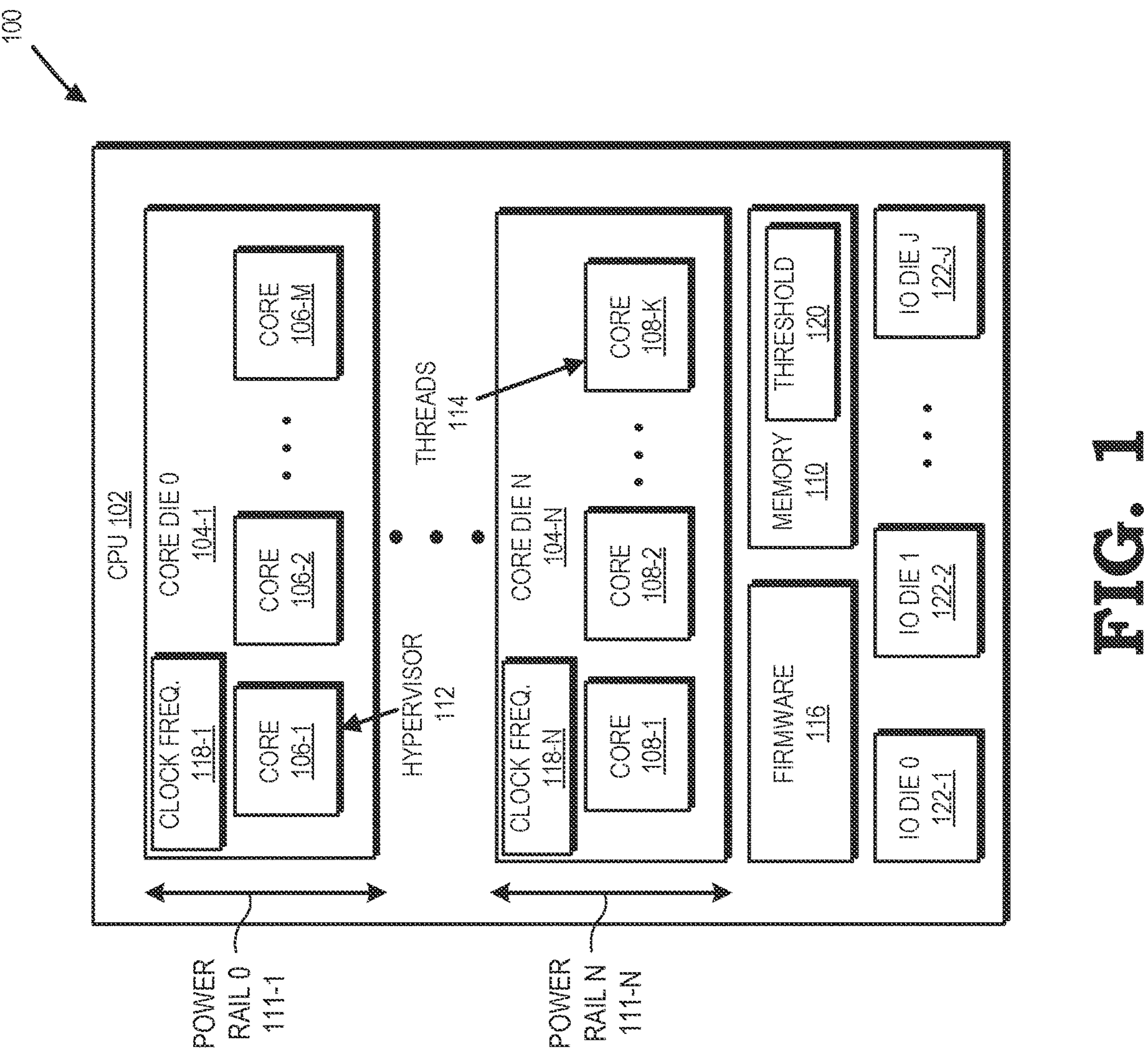
FIG. 1 is a block diagram of a processing system implementing core die power management in accordance with some implementations.

In virtualized computing, processors are often allocated to various different tasks. However, allocating different core dies of a central processing unit (CPU) to different virtual machines (VMs) results in active threads being split, or spread out, among a number of different core dies and processor cores. This sparse allocation of threads among different core dies and processor cores often results in excess power usage and limited performance due to the processing system needing to provide power to each of the core dies, including any caches or other associated components, even if one or more processor cores are assigned a sleep or low-power standby state. In order to optimize power usage and maximize performance, in some implementations, a hypervisor, firmware, or software assigns VMs or threads to a first core die and disconnects power from a second core die with no active threads or cores (e.g., by adjusting one or more associated voltage regulators), while still providing power to the first core die. In some implementations, active threads or processing cores are migrated from sparsely allocated processing cores or core dies into a reduced number of core dies. In some implementations, power usage is minimized by disconnecting one or more inactive core dies from power while performance is maximized by increasing the clock frequency of remaining active core dies or remaining active processing cores located therein.

FIGS. 1-4 illustrate techniques for implementing core die power management in a processing system. In order to optimize power usage and maximize performance in a CPU with multiple core dies, the processing system manages power to reduce power usage by inactive cores while potentially improving performance by enabling active core dies to use additional power based on the power saved through the power reduction in the inactive cores. In some implementations, a hypervisor, firmware in the CPU, or software or firmware located outside of the CPU assigns VMs or threads to a first core die and disconnects power from a second core die with no active threads or processing cores, while still providing power to the first core die. VMs are software-based emulations of physical computers, which allow multiple operating systems, computing instances, or contexts (i.e., sets of information associated with the current execution of one or more processes or threads) to run on a single physical machine. Threads are the smallest units of execution within a process. By constraining VMs and/or threads to a minimum number of cores while powering down inactive core dies, significant power savings are achievable. In some implementations, the processing system (e.g., via a hypervisor or firmware) disconnects a power rail connected to the second core die from power. In this way, in some implementations, power usage is minimized by disconnecting one or more inactive core dies from power while performance is maximized by increasing the clock frequency of the remaining active core dies or the remaining active processing cores located therein. This solution enables the processing system to be utilized fully when needed and to run efficiently when a number of active threads or cores is less than a given threshold. By disabling unnecessary regions of the system, the power savings can be used to generate better performance for the threads currently active on the system.

In some implementations, the processing system flushes one or more caches contained in the second core die prior to disconnecting power from the second core die and migrates one or more threads or processing cores from the second core die to the first core die. By actively migrating sparsely allocated processing cores or threads to a single core die or limited number of core dies and disconnecting power from inactive core dies, power savings and increased performance are attainable even in a processing system that was previously heavily utilized. As the heavy utilization subsides and fewer cores or threads remain active, migrating and combining the remaining active processing cores or threads into fewer core dies provides an opportunity to disconnect power from inactive core dies and obtain the benefits of minimized power usage and maximized performance noted above.

FIG. 1 is a block diagram of a processing system 100 implementing core die power management, according to some implementations. As an example, the processing system 100 includes a server system (e.g., one or more physical servers, virtual servers) configured to execute one or more applications (e.g., machine-learning applications, artificial intelligence (AI) applications, deep learning applications, shader applications, High-performance computing (HPC) applications, data center applications, cloud computing applications). To support the execution of such applications, the processing system 100 includes or has access to a memory 110 or other storage component implemented using a non-transitory computer-readable medium, for example, a dynamic random-access memory (DRAM). However, in some implementations, the memory 110 is implemented using other types of memory including, for example, a cache, static random-access memory (SRAM), double data rate SDRAM (DDR SRAM), nonvolatile RAM, and the like. According to some implementations, the memory 110 includes an external memory implemented external to the processing units implemented in the processing system 100. In some implementations, the processing system 100 also includes a bus to support communication between entities implemented in the processing system 100, such as the memory 110, a CPU 102, IO devices, or any combination thereof.

In some implementations, the memory 110 is configured to store one or more operating systems to support the execution of one or more applications. Such operating systems, for example, include data (e.g., program code) indicating one or more operations, instructions, or both to support the execution of applications by the processing system 100. These operations and instructions include, for example, scheduling tasks (e.g., workloads, instructions) for one or more applications, allocating resources (e.g., registers, local data shares, scratch memory) to tasks for one or more applications, providing an interface to IO devices (e.g., hard disks, network interface controller, modem) for one or more applications, or any combination thereof.

Further, in some implementations, to support the execution of one or more applications, the processing system 100 includes a CPU 102 and one or more parallel processors, such as vector processors, coprocessors, non-scalar processors, highly parallel processors, artificial intelligence (AI) processors, inference engines, machine learning processors, other multithreaded processing units, scalar processors, serial processors, or any combination thereof. The processing system 100 includes one or more dies (e.g., core dies 104, also referred to as core chiplet dies), each including multiple compute units that collectively form one or more parallel processors. In some implementations, the CPU 102 is configured to receive and execute one or more instructions for one or more applications executed by the processing system 100 and generate commands to be executed at the one or more parallel processors.

In some implementations, the memory 110 includes program code for one or more applications executed by the processing system 100. Such program code, for example, includes data indicating one or more workloads, instructions, operations, or any combination thereof to be performed for one or more applications. As an example, in some implementations, the program code includes data indicating one or more instructions for an AI application, machine learning application, HPC application, or any combination thereof to be executed by the processing system 100. According to some implementations, the CPU 102 is configured to receive one or more instructions from program code and, using a plurality of processor cores (e.g., processor cores 106, 108), is configured to perform one or more operations for the instructions (e.g., one or more operations indicated in the instructions). To this end, the CPU 102 includes two or more core dies 104 powered by power rails (e.g., power rail 0 111-1 and power rail N 111-N) that each include one or more processor cores (e.g., one or more integrated circuits (ICs) that each include one or more processor cores). As an example, the implementation illustrated in FIG. 1 presents the CPU 102 as having two core dies (104-1, 104-N) representing an N number of core dies 104 with a first core die 0 104-1 including three processor cores (106-1, 106-2, 106-M) representing an M number of processor cores 106 and a second core die N 104-N including three processor cores (108-1, 108-2, 108-K) representing a K number of processor cores 108. Although the example implementation in FIG. 1 presents the CPU 102 as having two core dies (104-1, 104-N) representing an N number of core dies, in other implementations, the CPU 102 can include any number of core dies 104 and any number of power rails 111. Additionally, though the example implementation in FIG. 1 presents each core die 104 as having three processor cores (106-1, 106-2, 106-M, 108-1, 108-2, 108-K) representing an M and K number of processor cores 106, 108 respectively, in other implementations each core die 104 can include any number of processor cores. For example, in some implementations, a first core die 104 has a same number of processor cores as one or more other core dies 104, a first core die 104 has a different number of processor cores as one or more other core dies 104, or both.

According to some implementations, to perform one or more operations for one or more instructions of an application executed by the processing system 100, one or more processor cores 106, 108 of one or more core dies 104 of the CPU 102 each operate as a compute unit. These compute units each include one or more single instruction, multiple data (SIMD) units that perform the same operation on different data sets to produce one or more results. Such results, for example, include data resulting from the performance of one or more operations by one or more processor cores 106, 108. After producing one or more results, a compute unit is then configured to store the results in a cache within or otherwise coupled to the compute unit (e.g., the processor core 106, 108 operating as a compute unit), the memory 110, or both.

In some implementations, one or more processor cores 106 of a core die 104 functioning as a hypervisor 112 are configured to allocate a core die 104 of the CPU 102 to a VM executed by the processing system 100. For example, one or more processor cores 106 of a core die 104 functioning as the hypervisor 112 are configured to allocate a first core die 0 104-1 to a first VM. After a core die 104 is allocated to a VM, one or more processor cores 106 of the core die 104 are configured to execute one or more instructions, workloads, operations, or any combination thereof for one or more applications (machine-learning applications, AI applications, deep learning applications, shader applications, HPC applications, data center applications, cloud computing applications) being executed by the VM, the processing system 100, or both based on (e.g., as managed by) an operating system running on the VM. As an example, after core die 0 104-1 is allocated to a first VM, one or more processor cores 106 of core die 0 104-1 are configured to execute one or more instructions, workloads, operations, or any combination thereof for an application associated with the first VM.

In this way, one or more processor cores 106, 108 of one or more core dies 104 of the CPU 102 are configured to execute instructions, execute workloads, perform operations, or any combination thereof for one or more applications being executed by the processing system 100. However, in some implementations, allocating different core dies 104 of the CPU 102 to different VMs executed by the processing system 100 results in active threads, such as threads 114, being split, or spread out, among a number of different core dies 104 and processor cores 106, 108. This sparse allocation of threads among different core dies 104 and processor cores 106, 108 often results in excess power usage and limited performance due to the processing system 100 needing to provide power to each of the core dies 104, including any caches or other components contained therein, even if one or more processor cores 106, 108 are assigned a sleep, or low-power standby, state.

In order to optimize power usage and maximize performance, in some implementations, the hypervisor 112, firmware 116 in the CPU 102, or software or firmware located outside of the CPU 102 assigns VMs or threads to a first core die 104, such as core die 0 104-1, and disconnects power from a second core die 104 with no active threads or cores (e.g., by adjusting one or more associated voltage regulators), such as core die N 104-N, while still providing power to the first core die 104. In some implementations, disconnecting the second core die from power includes disconnecting a power rail 111 (e.g., via power gating the power rail N 111-N) connected to the second core die from power and/or flushing one or more caches, such as an L3 cache, contained in the second core die. For example, in some implementations, when a thread wakes or otherwise initiates execution, the thread requests a processor core from the hypervisor 112. The hypervisor 112 then identifies an active processor core, such as one of processor cores 106, 108, to which the thread can be allocated, with a preference for a processor core in a core die in which the thread was previously executed so as to take advantage of any valid cache entries that remain in the previously utilized core die.

Depending on the amount of power savings resulting from disabling one or more core dies 104 and thus the amount of excess power available to the processing system 100, in some implementations, a clock frequency 118 associated with one or more active core dies 104 or processing cores 106, 108 is increased while the one or more disabled core dies 104 remain disconnected from power. In this way, in some implementations, power usage is minimized by disconnecting one or more core dies 104 from power while performance is maximized by increasing the clock frequency 118 of the remaining active core dies 104 or the remaining active processing cores 106, 108 located therein.

In some implementations, the processing system 100 is configured to reconnect the second core die 104, such as core die N 104-N, to power based on a wake condition, which may include a request or instruction from the hypervisor 112 or a threshold 120 associated with a number of active processor cores, a number of active threads, or a rate of new processor cores or active threads being newly utilized or initialized or predicted to be utilized or initialized. For example, in some implementations, if an active core die 104, such as core die 0 104-1, has less than, e.g., 50% of its processing cores 106 available for new work or more than, e.g., 50% of its processing cores 106 in use, or if a number of active threads surpass, e.g., 50% of a maximum thread capacity of the active core die 104, then the processing system 100 reconnects the second core die 104 to power (although it is noted that 50% is only an example threshold and other percentages or measures of performance are used in some implementations). The processing system 100 performs this reconnection based on the wake condition in order to ensure that the processing system 100 maintains enough active core dies 104 and processor cores 106, 108 that it can allocate new threads or VMs to the CPU 102 without excess delay.

In some implementations, two or more thresholds 120 are used for different core dies 104 or different cores 106, 108, and in some implementations the threshold 120 is determined using machine learning based on historical performance of the processing system 100. For example, by monitoring performance of the CPU 102, including usage of core dies 104 and/or processor cores 106, 108, in some implementations, a machine learning algorithm actively determines thresholds 120 based on, e.g., the monitored historical performance of the processing system 100, a time of day, a day of the week, a power usage history for the processing system 100 or a facility housing the processing system 100, among others, or a combination thereof.

In some implementations, the hypervisor 112 is configured to initiate the disconnecting of a core die 104 from power. In other implementations, the firmware 116 is configured to initiate the disconnecting. When the firmware 116 initiates the disconnecting of a core die 104 from power, the firmware 116 provides the hypervisor 112 with an indication of the disconnecting such that the hypervisor 112 can avoid assigning work to disconnected core dies 104. For example, in some implementations, the firmware 116 stores the indication of the disconnecting in the memory 110 and the hypervisor 112 regularly (e.g., repeatedly at predetermined intervals or at predicted effective times determined using machine learning) polls the memory 110 for, e.g., a list of active and/or disabled core dies 104. In other implementations, the firmware 116 generates a software interrupt at the hypervisor 112 to provide a direct indication of the disconnecting.

In some implementations, the CPU 102 includes two or more input/output ("IO") dies that one or more processor cores 106, 108 utilize to interface with other CPUs, memories, or other external components. As an example, the implementation illustrated in FIG. 1 presents the CPU 102 as having three IO dies (122-1, 122-2, 122-J) representing a J number of IO dies 122. Although the example implementation in FIG. 1 presents the CPU 102 as having three IO dies (122-1, 122-2, 122-J) representing a J number of IO dies 122, in other implementations, the CPU 102 can include any number of IO dies 122. In some implementations, the hypervisor 112 and/or the firmware 116 allocates or reallocates active processor cores 106 to a minimal number of IO dies 122 to maximize power savings and/or actively consolidates VMs or threads to a minimal number of IO dies 122 to save power.

Depending on the amount of power savings resulting from disabling one or more IO dies 122 and thus the amount of excess power available to the processing system 100, in some implementations, a clock frequency associated with one or more active IO dies 122 is increased while the one or more disabled IO dies 122 remain disconnected from power or in a low power mode. In this way, in some implementations, power usage is minimized by disconnecting one or more IO dies 122 from power or putting the inactive IO dies 122 into a low power mode (i.e., disabling the inactive IO dies 122) while performance is maximized by increasing the clock frequency of the remaining active IO dies 122.

Figure 2:
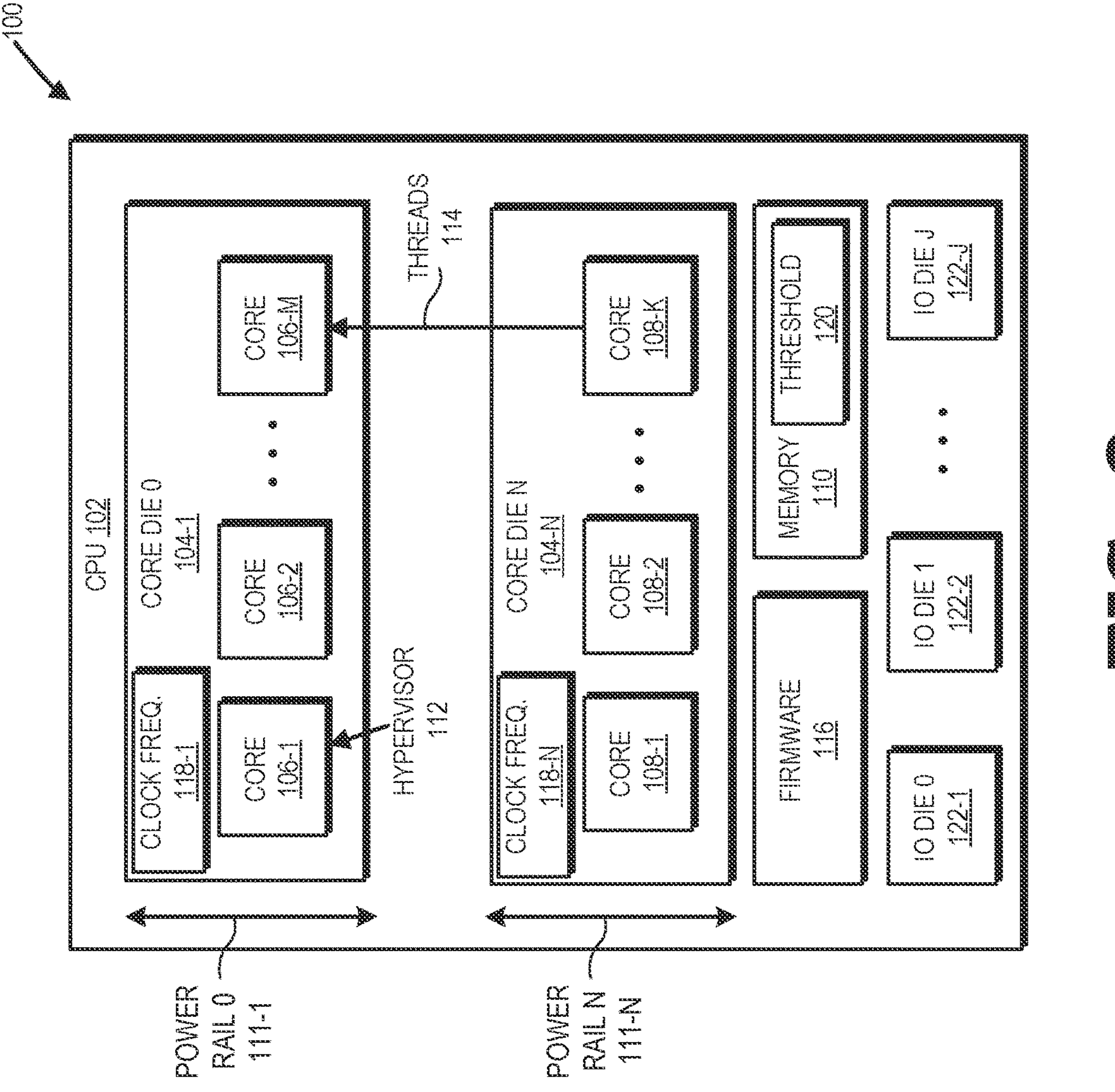
FIG. 2 is a block diagram of the processing system of FIG. 1 illustrating thread migration in accordance with some implementations.

In some implementations, the processing system 100 is configured to migrate threads from the second processor core to the first processor core prior to disconnecting the second processor core from power. For example, FIG. 2 is a block diagram of the processing system of FIG. 1 illustrating thread migration in accordance with some implementations. As shown in FIG. 2, in some implementations, threads 114 running in processing core 108-K of the core die N 104-N are migrated to the processing core 106-M of the core die 0 104-1 prior to disconnecting the core die N 104-N from power. In some implementations, thread migration from lower priority core dies (e.g., core die N 104-N) to higher priority core dies (e.g., core die 0 104-1) is performed on a regular basis. Similarly, in some implementations, the processing system 100 regularly (e.g., repeatedly at predetermined intervals or at predicted effective times determined using machine learning) migrates or reassigns VMs or threads to a minimal number of IO dies 122 while disconnecting any inactive IO dies 122 or putting the inactive IO dies 122 into a low-power mode to save power.

In other implementations, thread migration is performed when a threshold condition is met, such as when the core die N 104-N has fewer active processing cores 108 than the core die 0 104-1 has available processing cores 106. In other words, in some implementations, thread migration is performed when all of the work currently being performed by a lower priority core die can be performed by a higher priority core die. In some implementations, such as where the processing system 100 ensures that at least 50% of the processing cores 106, 108 in at least one active core die 104 are available at any given time, threads will only be migrated to a new core die 104 if the at least 50% of the processing cores 106, 108 in at least one active core die 104 can be kept available for other work. In other words, in some implementations, if migrating threads from the processing core 108-K to the processing core 106-M will reduce the availability of processing cores 106, 108 in the core die 0 104-1 to below 50% and no other core die has 50% or more of its processing cores available for work, then the migration will not be performed (as noted above, 50% is only an example threshold and other percentages or measures of performance are used in some implementations). In this way, excessive thread migrations and associated performance reductions are minimized. For example, in some implementations, each time a thread or processing core enters or exits an active state, the hypervisor 112 or firmware 116 determines whether a number of spare (i.e., active and available) processing cores is above or below one or more thresholds. When the number of spare processing cores is below a given threshold (e.g., 30% or 50%), a disconnected core die is reconnected to power to ensure that the threshold number of spare processing cores is available. On the other hand, when the number of spare processing cores is above a given threshold (e.g., 50% or 70%), thread or core migrations are initiated and/or inactive core dies are disconnected from power.

Similarly, in some implementations, the processing system 100 manages assignment of VMs or threads to a minimal number of IO dies 122 based on one or more thresholds. For example, in some implementations, the hypervisor 112 or the firmware 116 monitors an amount of IO bandwidth used by one or more cores 106, 108 or core dies 104. When the amount of IO bandwidth exceeds or falls below one or more thresholds, one or more IO dies 122 are enabled or disabled, respectively. For example, in some implementations, different thresholds are associated with different numbers of active IO dies 122, such that as IO bandwidth utilization exceeds each threshold, a new IO die 122 is enabled (e.g., connected to power or taken out of a low power mode), or as IO bandwidth utilization drops below each threshold, another IO die 122 is disconnected from power or put into a low power mode.

Figure 3:
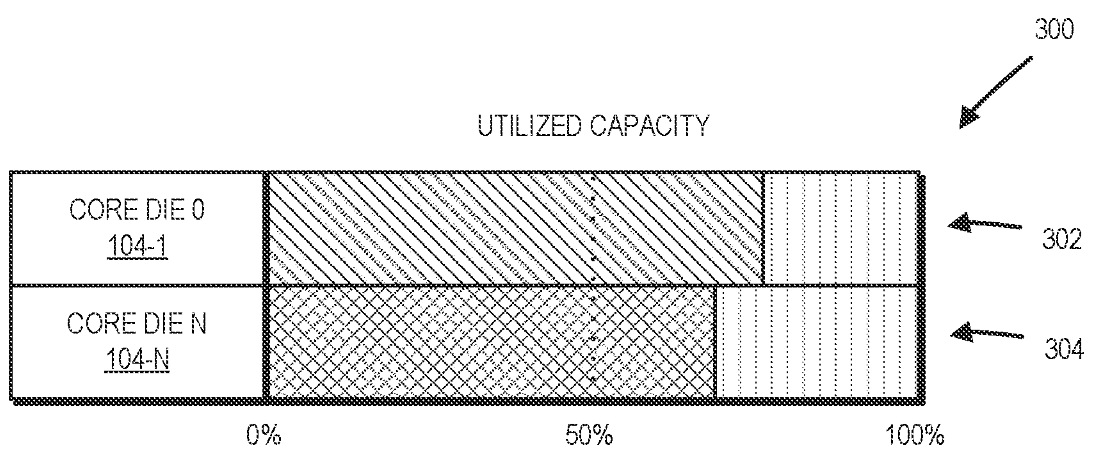
FIG. 3 is a set of graphs illustrating core die usage and thread migration thresholds in accordance with some implementations.
Figure 3:
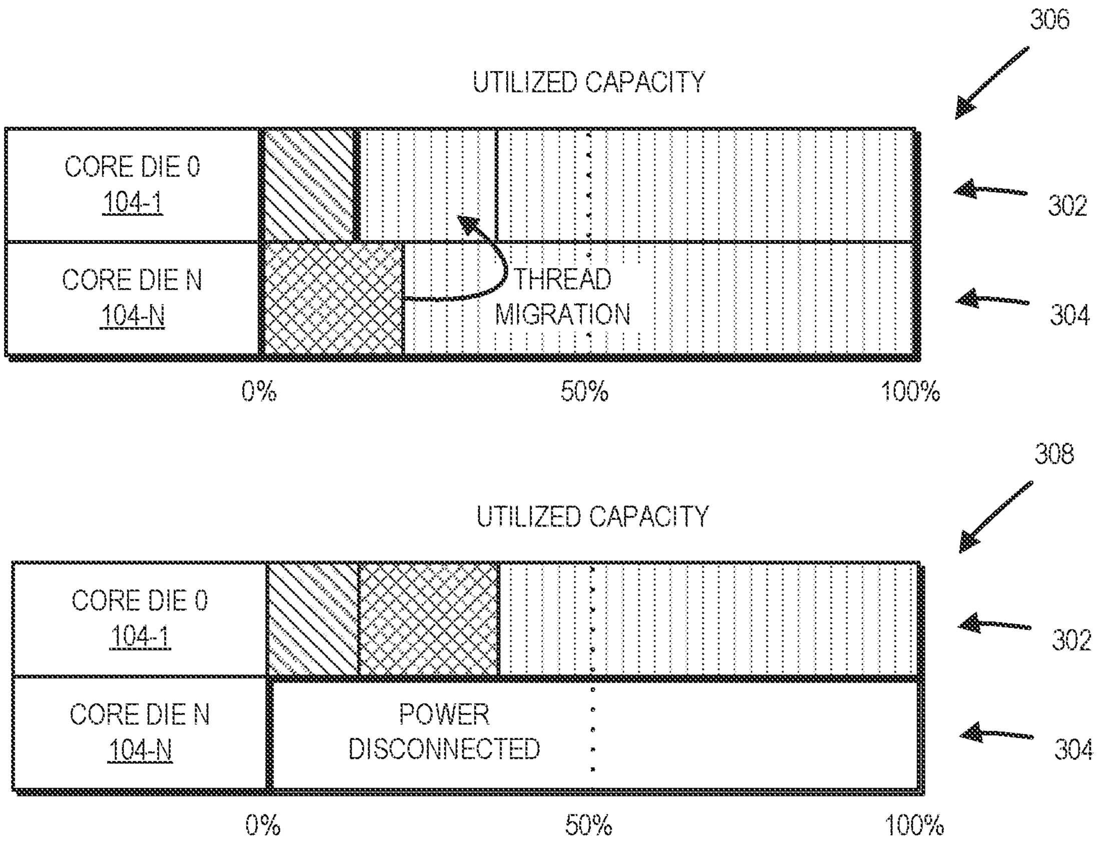

FIG. 3 is a set of graphs illustrating core die usage and thread migration thresholds in accordance with some implementations. For example, graph 300 illustrates the utilized thread capacity 302 of the core die 0 104-1 and the utilized thread capacity 304 of the core die N 104-N. As shown, both the utilized thread capacity 302 of the core die 0 104-1 and the utilized thread capacity 304 of the core die N 104-N are above 50%. Accordingly, in some implementations, assuming every other core die 104 were at full capacity or disconnected from power, a thread migration would not be performed in this scenario, as it is not possible to migrate the processes of the core die N 104-N to the core die 0 104-1 without exceeding the capacity of core die 0 104-1.

On the other hand, as shown in graphs 306 and 308, in some implementations, again assuming every other core die 104 were at full capacity or disconnected from power, when the core die 0 104-1 and the core die N 104-N have relatively low utilized thread capacity and the threads from one core die can be migrated to another core die without exceeding, e.g., 50% of remaining thread capacity in the core die to which the threads are migrated, threads are migrated from one of the core dies to the other and the inactive core die is disconnected from power. For example, in graph 308, threads of the core die N 104-N are migrated to the core die 0 104-1 as indicated in graph 306 and illustrated in graph 308, after which the core die N 104-N is disconnected from power. However, in some implementations, if the utilized thread capacity of core die 0 104-1 increases and exceeds, e.g., 50%, the core die N 104-N is reconnected to power to ensure that the processing system 100 maintains enough active core dies 104 that it can allocate new threads or VMs without excess delay.

Figure 4:
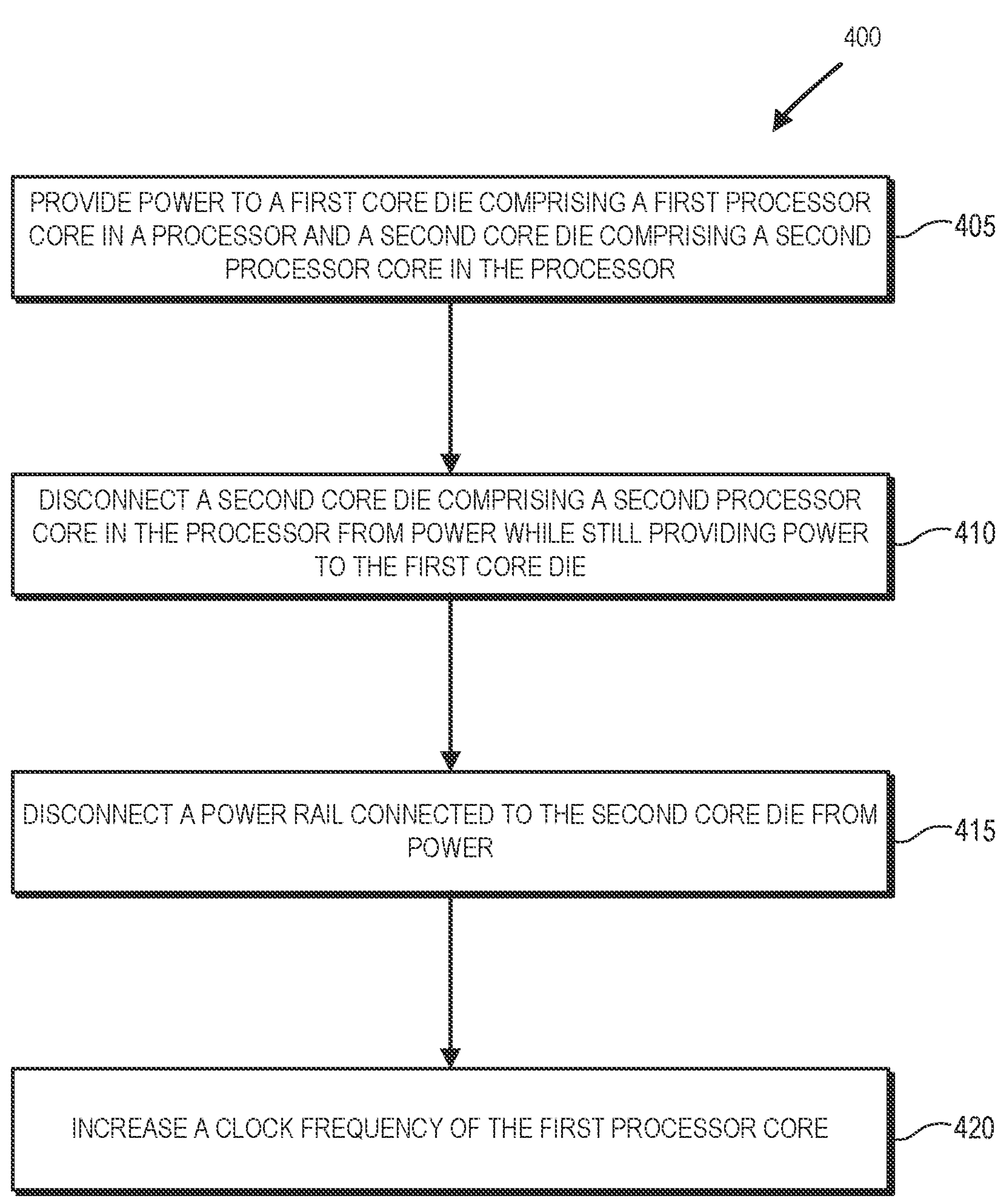
FIG. 4 is a flow diagram illustrating an example method for implementing core die power management in accordance with some implementations.

FIG. 4 is a flow diagram illustrating an example method 400 for implementing core die power management that is performed by processing system 100 in accordance with some implementations. At block 405, the processing system 100 provides power to a first core die, such as core die 0 104-1, comprising a first processor core, such as processing core 106-M, in a processor, such as CPU 102, and a second core die, such as core die N 104-N, comprising a second processor core, such as processing core 108-K, in the processor. At block 410, the processing system 100 disconnects the second core die N 104-N from power while maintaining power to the first core die 0 104-1. In some implementations, as shown at block 415, disconnecting the second core die N 104-N from power includes disconnecting a power rail connected to the second core die N 104-N from power. At block 420, taking advantage of power savings resulting from the disconnecting of the second core die N 104-N from power performed at block 410, the processing system 100 increases a clock frequency, such as clock frequency 118-1, of the first processor core 108-K and/or first processor core die 0 104-1 after the disconnecting. In some implementations, as discussed above, the method 400 includes migrating threads from the second core die N 104-N to the first core die 0 104-1 prior to disconnecting the second core die N 104-N and/or vice versa prior to reconnecting the second core die N 104-N to power based on a wake condition.

In some implementations, the apparatus and techniques described above are implemented in a system including one or more integrated circuit (IC) devices (also referred to as integrated circuit packages or microchips), such as the processing system 100 described above with reference to FIGS. 1-4. Electronic design automation (EDA) and computer aided design (CAD) software tools may be used in the design and fabrication of these IC devices. These design tools typically are represented as one or more software programs. The one or more software programs include code executable by a computer system to manipulate the computer system to operate on code representative of circuitry of one or more IC devices so as to perform at least a portion of a process to design or adapt a manufacturing system to fabricate the circuitry. This code can include instructions, data, or a combination of instructions and data. The software instructions representing a design tool or fabrication tool typically are stored in a computer readable storage medium accessible to the computing system. Likewise, the code representative of one or more phases of the design or fabrication of an IC device may be stored in and accessed from the same computer readable storage medium or a different computer readable storage medium.

A computer readable storage medium may include any non-transitory storage medium, or combination of non-transitory storage media, accessible by a computer system during use to provide instructions and/or data to the computer system. Such storage media can include, but is not limited to, optical media (e.g., compact disc (CD), digital versatile disc (DVD), Blu-Ray disc), magnetic media (e.g., floppy disk, magnetic tape, or magnetic hard drive), volatile memory (e.g., random access memory (RAM) or cache), non-volatile memory (e.g., read-only memory (ROM) or Flash memory), or microelectromechanical systems (MEMS)-based storage media. The computer readable storage medium may be embedded in the computing system (e.g., system RAM or ROM), fixedly attached to the computing system (e.g., a magnetic hard drive), removably attached to the computing system (e.g., an optical disc or Universal Serial Bus (USB)-based Flash memory), or coupled to the computer system via a wired or wireless network (e.g., network accessible storage (NAS)).

In some implementations, certain aspects of the techniques described above may be implemented by one or more processors of a processing system executing software. The software includes one or more sets of executable instructions stored or otherwise tangibly embodied on a non-transitory computer readable storage medium. The software can include the instructions and certain data that, when executed by the one or more processors, manipulate the one or more processors to perform one or more aspects of the techniques described above. The non-transitory computer readable storage medium can include, for example, a magnetic or optical disk storage device, solid state storage devices such as Flash memory, a cache, random access memory (RAM) or other non-volatile memory device or devices, and the like. The executable instructions stored on the non-transitory computer readable storage medium may be in source code, assembly language code, object code, or other instruction format that is interpreted or otherwise executable by one or more processors.

Note that not all of the activities or elements described above in the general description are required, that a portion of a specific activity or device may not be required, and that one or more further activities may be performed, or elements included, in addition to those described. Still further, the order in which activities are listed is not necessarily the order in which they are performed. Also, the concepts have been described with reference to specific implementations. However, one of ordinary skill in the art appreciates that various modifications and changes can be made without departing from the scope of the present disclosure as set forth in the claims below. Accordingly, the specification and figures are to be regarded in an illustrative rather than a restrictive sense, and all such modifications are intended to be included within the scope of the present disclosure.

Benefits, other advantages, and solutions to problems have been described above with regard to specific implementations. However, the benefits, advantages, solutions to problems, and any feature(s) that may cause any benefit, advantage, or solution to occur or become more pronounced are not to be construed as a critical, required, or essential feature of any or all the claims. Moreover, the particular implementations disclosed above are illustrative only, as the disclosed subject matter may be modified and practiced in different but equivalent manners apparent to those skilled in the art having the benefit of the teachings herein. No limitations are intended to the details of construction or design herein shown, other than as described in the claims below. It is therefore evident that the particular implementations disclosed above may be altered or modified and all such variations are considered within the scope of the disclosed subject matter. Accordingly, the protection sought herein is as set forth in the claims below.

What is claimed is:

1. An apparatus comprising:

a processor comprising:

a first chiplet, the first chiplet comprising a first processor core or associated with a first input/output (IO) die; and a second chiplet, the second chiplet comprising a second processor core or associated with a second IO die, wherein the apparatus is configured to disconnect the second chiplet from power while providing power to the first chiplet and increase a clock frequency of the first processor core after the disconnecting.

2. The apparatus of claim 1, further comprising a power rail connected to the second chiplet, wherein disconnecting the second chiplet from power includes disconnecting the power rail from power.

3. The apparatus of claim 1, further comprising a hypervisor configured to initiate the disconnecting.

4. The apparatus of claim 1, further comprising firmware configured to initiate the disconnecting.

5. The apparatus of claim 4, wherein the firmware provides a hypervisor with an indication of the disconnecting.

6. The apparatus of claim 1, wherein the apparatus is configured to migrate threads from the second processor core to the first processor core prior to the disconnecting.

7. The apparatus of claim 1, wherein the apparatus is configured to reconnect the second chiplet to power based on a wake condition.

8. The apparatus of claim 7, wherein the wake condition includes a threshold associated with a number of active processor cores or a number of active threads.

9. The apparatus of claim 1, wherein the apparatus is configured to reassign a thread from the first IO die to the second IO die and disable the first IO die after the reassigning.

10. A method comprising:

providing power to a first chiplet, the first chiplet comprising a first processor core or associated with a first input/output (IO) die in a processor, and a second chiplet, the second chiplet comprising a second processor core or associated with a second IO die in the processor;

disconnecting the second chiplet from power while maintaining power to the first chiplet; and increasing a clock frequency of the first processor core after the disconnecting.

11. The method of claim 10, wherein the disconnecting includes disconnecting a power rail connected to the second chiplet from power.

12. The method of claim 10, further comprising migrating threads from the second processor core to the first processor core prior to the disconnecting.

13. The method of claim 10, further comprising reconnecting the second chiplet to power based on a wake condition.

14. A non-transitory computer readable medium embodying a set of executable instructions, the set of executable instructions to manipulate at least one processor to:

provide power to a first chiplet, the first chiplet comprising a first processor core or associated with a first input/output (IO) die in a processor, and a second chiplet, the second chiplet comprising a second processor core or associated with a second IO die in the processor;

disconnect the second chiplet from power while maintaining power to the first chiplet; and increase a clock frequency of the first processor core after the disconnecting.

15. The non-transitory computer readable medium of claim 14, wherein the disconnecting includes disconnecting a power rail connected to the second chiplet from power.

16. The non-transitory computer readable medium of claim 14, the set of executable instructions to further manipulate the at least one processor to migrate threads from the second processor core to the first processor core prior to the disconnecting.

17. The non-transitory computer readable medium of claim 14, the set of executable instructions to further manipulate the at least one processor to reconnect the second chiplet to power based on a wake condition.

* * * * *